United States Patent
Nelson

(10) Patent No.: US 11,917,957 B2
(45) Date of Patent: Mar. 5, 2024

(54) HYDROPONIC GROW SYSTEMS

(71) Applicant: Thomas Eugene Nelson, San Diego, CA (US)

(72) Inventor: Thomas Eugene Nelson, San Diego, CA (US)

(*) Notice: Subject to any disclaimer, the term of this patent is extended or adjusted under 35 U.S.C. 154(b) by 256 days.

(21) Appl. No.: 16/398,467

(22) Filed: Apr. 30, 2019

(65) Prior Publication Data

US 2019/0327921 A1  Oct. 31, 2019

Related U.S. Application Data

(60) Provisional application No. 62/799,073, filed on Jan. 31, 2019, provisional application No. 62/739,362, filed on Oct. 1, 2018, provisional application No. 62/664,456, filed on Apr. 30, 2018.

(51) Int. Cl.
*A01G 31/02* (2006.01)
*A01G 9/02* (2018.01)
*A01G 9/24* (2006.01)
*A01G 27/00* (2006.01)

(52) U.S. Cl.
CPC ............ *A01G 31/02* (2013.01); *A01G 9/02* (2013.01); *A01G 9/247* (2013.01); *A01G 27/00* (2013.01)

(58) Field of Classification Search
CPC .......... A01G 31/02; A01G 9/02; A01G 9/247; A01G 27/00
See application file for complete search history.

(56) References Cited

U.S. PATENT DOCUMENTS

| | | | |
|---|---|---|---|
| 2,674,828 A | 4/1954 | Tegner | |
| 3,660,933 A * | 5/1972 | Wong, Jr. ............... | A01G 31/02 47/62 C |
| 4,045,909 A * | 9/1977 | Moss ..................... | A01G 31/02 405/36 |
| 4,279,101 A | 7/1981 | Leroux | |
| 4,332,105 A * | 6/1982 | Nir ......................... | A01G 31/02 239/69 |
| 4,860,490 A | 8/1989 | Morris et al. | |
| 4,951,416 A * | 8/1990 | Gutridge ................ | A01G 31/02 47/62 R |
| 5,056,260 A | 10/1991 | Sutton | |
| 5,285,595 A | 2/1994 | Shirato | |
| 5,826,374 A * | 10/1998 | Baca ...................... | A01G 31/02 47/62 E |
| 5,887,383 A * | 3/1999 | Soeda .................... | A01G 31/02 47/59 R |
| 5,937,575 A * | 8/1999 | Zobel ..................... | A01G 31/02 47/62 A |
| 6,135,467 A | 10/2000 | Tagariello | |

(Continued)

*Primary Examiner* — Monica L Perry
*Assistant Examiner* — Megan J Moroney
(74) *Attorney, Agent, or Firm* — Genius Patent APC; Bruce Hare

(57) ABSTRACT

A hydroponic grow system includes: multiple grow containers; a reservoir; and a water pump, where an output of the water pump is coupled to an inlet of the reservoir and at least one outlet of the reservoir is coupled to an input of the water pump. A hydroponic grow container includes: a grow vessel; and an adaptable manifold coupled to the grow vessel. A hydroponic reservoir including: at least one inlet; at least one outlet; a return tank; and a distribution tank.

12 Claims, 16 Drawing Sheets

(56) References Cited

U.S. PATENT DOCUMENTS

| | | | |
|---|---|---|---|
| 6,233,870 B1* | 5/2001 | Horibata | A01G 31/02 47/62 R |
| 7,013,600 B1* | 3/2006 | Bae | A01G 31/02 47/61 |
| 7,823,328 B2* | 11/2010 | Walhovd | A01G 31/02 47/62 A |
| 8,250,809 B2* | 8/2012 | Simmons | A01G 31/02 47/62 N |
| 8,333,394 B1 | 12/2012 | Cisneros | |
| 8,726,568 B2 | 5/2014 | Wilson et al. | |
| 8,915,016 B2 | 12/2014 | Wilson et al. | |
| 9,258,953 B2 | 2/2016 | Wilson et al. | |
| 9,277,696 B2 | 3/2016 | Wilson et al. | |
| 9,532,516 B2* | 1/2017 | Church | A01G 31/02 |
| 10,681,877 B1* | 6/2020 | Goodwin | A01G 31/02 47/61 |
| 2007/0062112 A1* | 3/2007 | Stover | A01G 31/02 47/59 R |
| 2008/0229661 A1* | 9/2008 | Brooke | A01G 31/02 47/62 R |
| 2012/0192487 A1* | 8/2012 | Tanaka | A01G 31/02 47/60 |
| 2014/0075841 A1 | 3/2014 | Degraff | |
| 2015/0208598 A1 | 6/2015 | Kern | |
| 2015/0289463 A1* | 10/2015 | Moriarty | A01G 27/001 47/62 R |
| 2015/0327451 A1* | 11/2015 | Koyama | A01K 63/04 47/62 R |
| 2015/0351339 A1 | 12/2015 | Carmody | |
| 2017/0099790 A1* | 4/2017 | Gonyer | A01G 31/02 |
| 2017/0105368 A1* | 4/2017 | Mehrman | A01G 27/005 |
| 2017/0208757 A1* | 7/2017 | Valmont | A01G 31/02 |
| 2018/0035626 A1* | 2/2018 | Bailey | A01G 31/06 |
| 2019/0269078 A1* | 9/2019 | Gao | A01G 31/02 47/61 |

\* cited by examiner

HYDROPONIC GROW SYSTEMS

CROSS-REFERENCE TO RELATED APPLICATIONS

This application claims priority to U.S. Provisional Patent Application Ser. No. 62/664,456, filed on Apr. 30, 2018. This application claims priority to U.S. Provisional Patent Application Ser. No. 62/739,362, filed on Oct. 1, 2018. This application claims priority to U.S. Provisional Patent Application Ser. No. 62/799,073, filed on Jan. 31, 2019.

BACKGROUND

Many people utilize hydroponics to grow plants without soil by using mineral nutrient solutions in a water solvent. Plants may be grown with only roots exposed to the mineral solution.

Existing systems require users to slowly add nutrients to prevent rapid changes to the mineral solution. In addition, existing solutions do not evenly distribute nutrients among plants.

Thus there is a need for hydroponic grow equipment that is able to mix full nutrient doses with even distribution among plants.

SUMMARY

Some embodiments may provide devices, components, systems, and/or methods for implementing hydroponics. Such elements may include grow containers. Each grow container may include a grow basket or other appropriate resource for supporting a plant or plants. The grow containers may each include one or more inlets and/or outlets for distributing fluids among the containers.

Some embodiments may include reservoirs for mixing and distributing nutrients. Such reservoirs may include one or more filters.

The grow containers and/or reservoirs may include various mixing elements for evenly distributing nutrients among plants and/or aerating a grow solution. Such mixing elements may include nozzles and/or other appropriate features that may generate a vortex or other mixing environment. In addition, the grow containers and/or reservoirs may include various injectors for aerating the solution.

Some embodiments may include structural supports for the grow containers, reservoirs, plants, plant baskets, and/or other elements of the hydroponic systems described herein.

The elements described herein may include various adjustment features that may allow the mixing elements and/or other features to be positioned such that desired system characteristics are achieved.

Some embodiments may provide recirculating systems using the components described throughout. Such systems may generally include a feedback loop whereby distributed solution is returned to a mixing chamber or reservoir for further mixing with other returned solution, fresh solution or clean water, and/or added nutrients. Such an approach allows for a thorough mixture among containers with an even distribution of nutrients. This allows a grower to add a full measure of nutrients without causing solution attributes to spike.

The preceding Summary is intended to serve as a brief introduction to various features of some exemplary embodiments. Other embodiments may be implemented in other specific forms without departing from the scope of the disclosure.

BRIEF DESCRIPTION OF THE SEVERAL VIEWS OF THE DRAWINGS

The exemplary features of the disclosure are set forth in the appended claims. However, for purpose of explanation, several embodiments are illustrated in the following drawings.

DETAILED DESCRIPTION

The following detailed description describes currently contemplated modes of carrying out exemplary embodiments. The description is not to be taken in a limiting sense, but is made merely for the purpose of illustrating the general principles of some embodiments, as the scope of the disclosure is best defined by the appended claims.

Various features are described below that can each be used independently of one another or in combination with other features. Broadly, some embodiments generally provide air injection features, growth vessels, and distribution systems for use in hydroponic growing. In addition, some embodiments provide features for mixing supplies (e.g., grow nutrients, clean water, etc.) among multiple containers in a grow system.

A first exemplary embodiment provides a hydroponic grow system comprising: a plurality of grow containers; a reservoir; and a water pump, wherein an output of the water pump is coupled to an inlet of the reservoir and at least one outlet of the reservoir is coupled to an input of the water pump.

A second exemplary embodiment provides a hydroponic grow container comprising: a grow vessel; and an adaptable manifold coupled to the grow vessel.

A third exemplary embodiment provides a hydroponic reservoir comprising: at least one inlet; at least one outlet; a return tank; and a distribution tank.

Several more detailed embodiments are described in the sections below. Section I provides a description of grow containers and injectors used by some embodiments. Section II then describes plant management and structural elements used by some embodiments. Next, Section III describes various mixing architectures used by some embodiments. Section IV then describes filtering architectures used by some embodiments. Section V follows with a description of several exemplary recirculating systems provided by some embodiments.

I. Grow Containers and Injectors

Figure 1A:
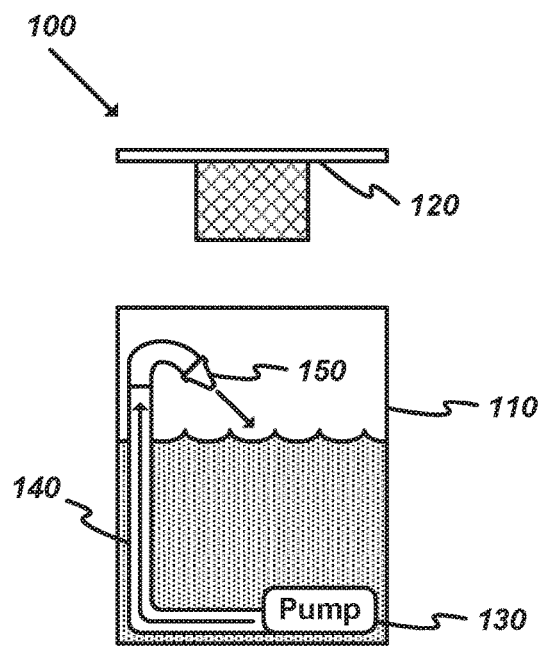
FIG. 1A illustrates a front elevation view of a hydroponic grow container according to an exemplary embodiment.
Figure 1B:
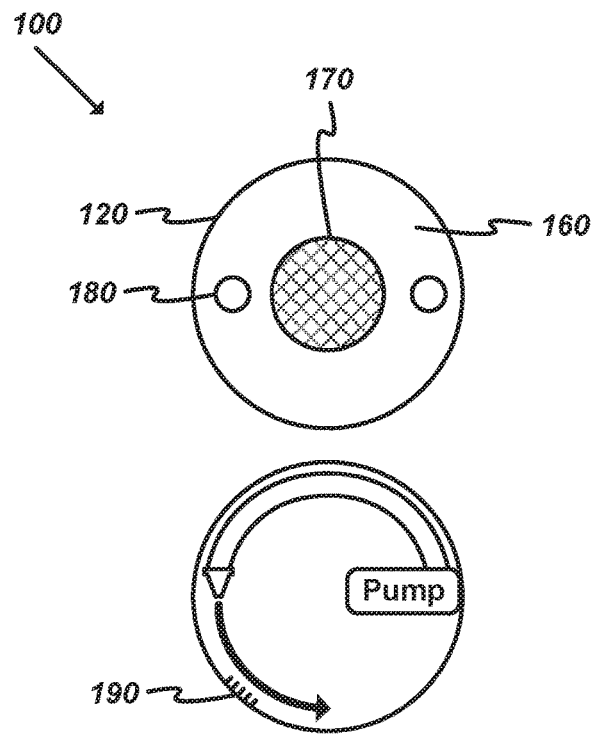
FIG. 1B illustrates a top plan view of the hydroponic grow container of FIG. 1A.

FIG. 1A illustrates a front elevation view of a hydroponic grow container 100 according to an exemplary embodiment. FIG. 1B illustrates a top plan view of the hydroponic grow container 100. As shown, the container may include a vessel or bucket 110, a lid 120, a pump 130, water supply conduit or piping 140, and an injection nozzle 150. The lid 120 may include a support ring 160, grow basket 170, and various through-holes 180. The vessel 110 may include blades or other turbulence elements 190.

The vessel 110 may be a cylindrical bucket or similar element that is able to retain fluid such as water. The bucket may be made of rigid material such as metal or plastic. The bucket may include various inlets and/or outlets (not shown), such as supply inlets, drain outlets, wiring ports, etc. Different embodiments may include different specific vessels, which may vary in a number of appropriate ways. For instance, different embodiments may include differently sized (e.g., different heights, widths or radii, volumes, etc.) and/or shaped (e.g., round, square, elliptical, rectangular, etc.) vessels.

The pump 130 may be able to take in fluid (e.g., water) and pump the fluid through the conduit 140 and nozzle 150 as shown.

The conduit 140 may include flexible and/or rigid materials (e.g., metal, plastic, etc.) and may be able to channel fluids along a path.

The nozzle 150 may include an inlet that is able to couple to the conduit and an outlet that is able to expel fluid. As shown, the nozzle may taper from a wider diameter to a narrower diameter. Different embodiments may use different specific nozzles and/or features. The nozzle may be used to create a vortex as indicated by the flow arrow.

The turbulence elements 190 may include protruding blades or other appropriate elements that may increase aeration as the output of the nozzle flows past the turbulence element.

The lid 120 may include various apertures 180 for exchanging air, routing wiring and/or conduit, etc. The lid 120 may include a grow basket 170 that may support soil or other material appropriate for growing plants. The grow basket may include various perforations, mesh, etc. that may allow the roots of a plant to contact the water in the vessel. The lid 120 may include a support ring 160 or other appropriate feature that is able to provide structural support and couple the lid 120 to the vessel 110.

Figure 2:
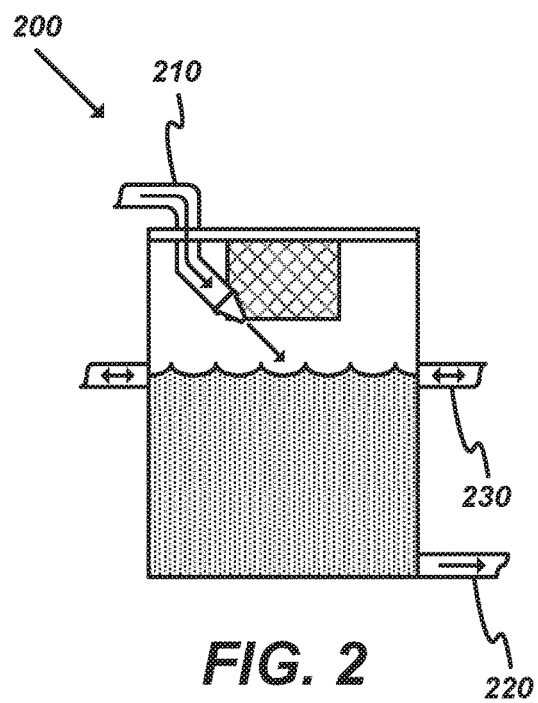
FIG. 2 illustrates a front elevation view of the hydroponic grow container of FIG. 1A including an alternative injection feature.

FIG. 2 illustrates a front elevation view of the hydroponic grow container 100 including an alternative injection feature 210 and return line 220. In this example, an external pump and supply are provided through the lid. In addition, this container includes levelling lines 230 that may be connected to an appropriate resource (e.g., a drain, a sump pump, etc.). The levelling lines may be connected across multiple containers in various appropriate ways (e.g., serial, parallel, hybrid, etc.).

Figure 3:
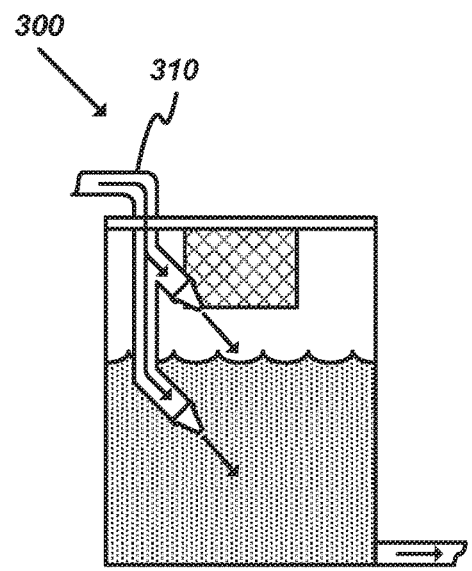
FIG. 3 illustrates a front elevation view of the hydroponic grow container of FIG. 1A including another alternative injection feature.

FIG. 3 illustrates a front elevation view of the hydroponic grow container 100 including another alternative injection feature 310. In this example, an external pump and supply are provided through the lid and includes two nozzles in order to generate additional force for vortex generation. Different embodiments may include different numbers of nozzles and/or different numbers of sets of nozzles (e.g., one container may include two sets of the two nozzle output 310). In this example, one nozzle is above the water level, while the second nozzle is below the water level. Different embodiments may be implemented in various different ways. For instance, some embodiments may include multiple nozzles above or below the water line.

Figure 4A:
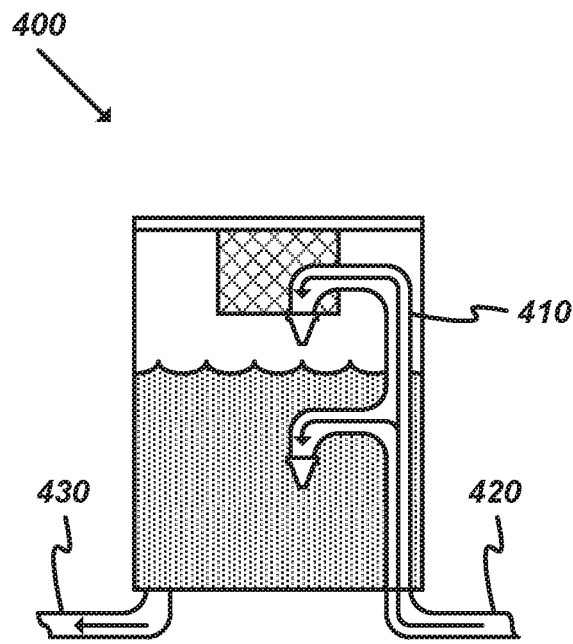
FIG. 4A a front elevation view of the hydroponic grow container of FIG. 1A including another alternative injection feature.

FIG. 4A a front elevation view of the hydroponic grow container 100 including another alternative injection feature 410. The nozzles in this example may be angled away from (or toward) the front view as shown in order to generate a vortex. In this example, the container 100 has a bottom-mounted irrigation line 420 and return line 430.

Figure 4B:
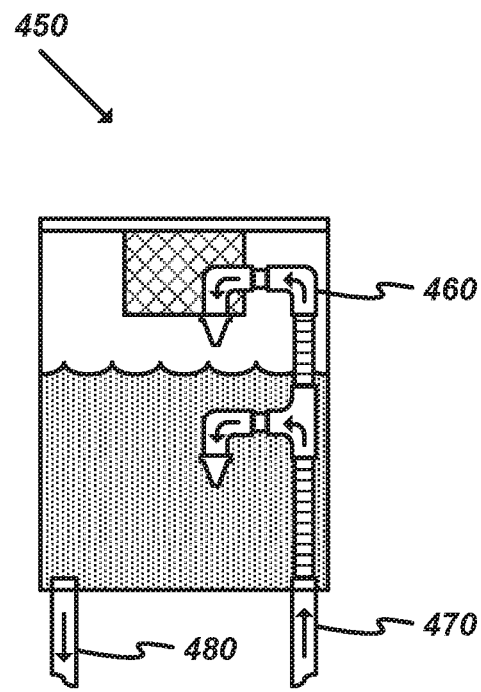
FIG. 4B a front elevation view of the hydroponic grow container of FIG. 1A including an adjustable alternative injection feature.

FIG. 4B a front elevation view of the hydroponic grow container 100 including an adjustable alternative injection feature 460 and also includes another alternative irrigation 470 and return line 480 implementation. The adjustable feature 460 allows for height adjustment, depth adjustment, and fine angular positioning of the output nozzles. Such a feature allows the vortex to be optimized for a particular container or application.

Other features described throughout may be similarly adjustable. Such adjustable features may include, for instance, flexible conduit, rotating members and/or connectors, valves or other flow regulators, etc.

Figure 5:
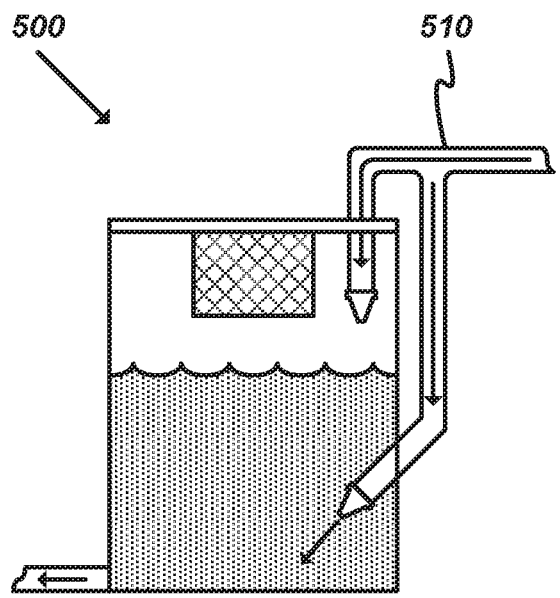
FIG. 5 illustrates a front elevation view of the hydroponic grow container of FIG. 1A including another alternative injection feature.

FIG. 5 illustrates a front elevation view of an alternative hydroponic grow container 500 including another alternative injection feature 510. In this example, a first nozzle is located above the water level, while a second nozzle and drain are located below the water level. The second nozzle may be aligned with the lower drain. Such an approach may induce an undertow that increases the amount of aeration and mixing power and accelerate the flow out the outlet of the container.

The various injectors described above may be collectively referred to as "vortex generating injectors". Such injectors may generally be used for mixing of solution within a grow container, reservoir, mixing container, or other appropriate element.

Figure 6:
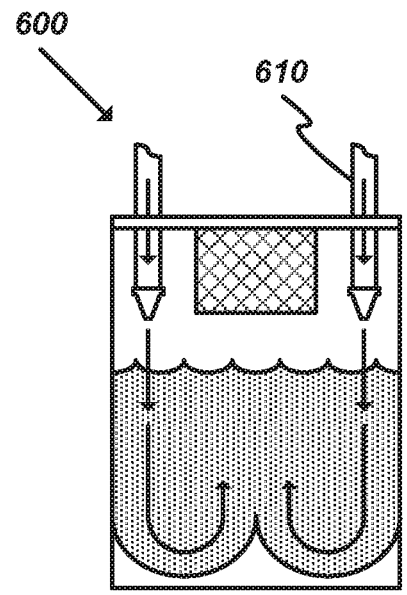
FIG. 6 illustrates a front elevation view of an alternative hydroponic grow container according to an exemplary embodiment.

FIG. 6 illustrates a front elevation view of an alternative hydroponic grow container 600 according to an exemplary embodiment. In this example, multiple vertically aligned injectors 610 are associated with a rounded vessel bottom that generates turbulence. In this example, there are two injectors with a single nozzle on each, but different embodiments may include various different numbers of injectors and/or nozzles (e.g., four, eight, twelve, etc.). Similarly, in any of the above and below example, multiple iterations of the illustrated injectors may be included. For instance, some embodiments may include two injectors spaced at one hundred eighty degrees around a circular vessel. As another example, some embodiments may include four injectors spaced at ninety degrees or four injectors placed at the corners of a cube-shaped vessel.

Figure 7:
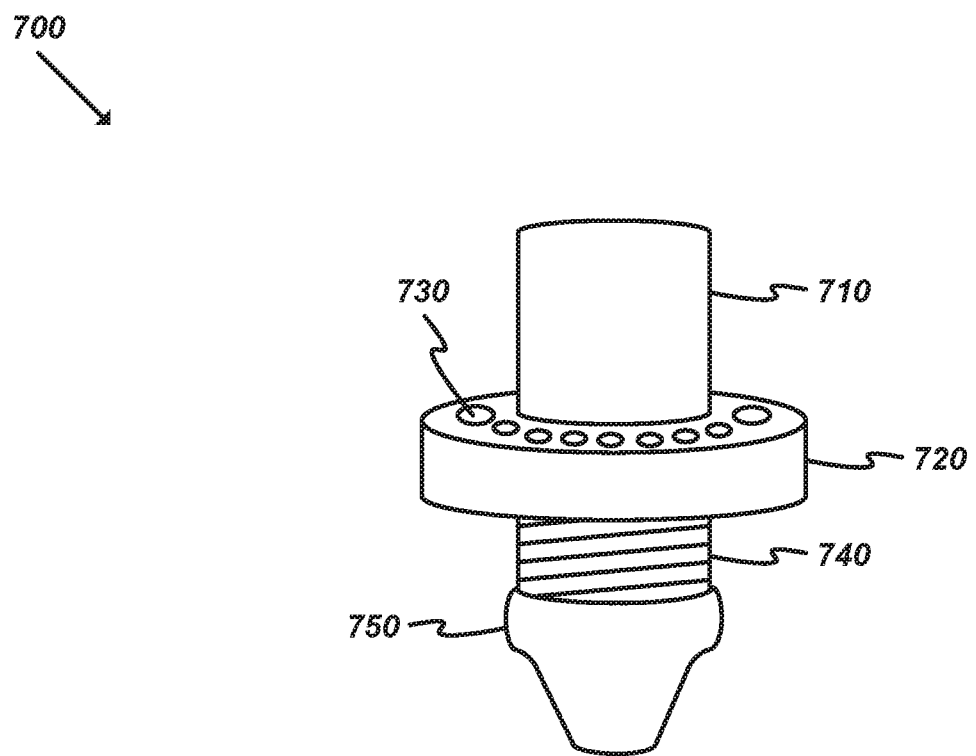
FIG. 7 illustrates a front elevation view of an injection nozzle according to an exemplary embodiment.

FIG. 7 illustrates a front elevation view of an injection nozzle 700 according to an exemplary embodiment. As shown, the nozzle may be attached to some conduit 710. The nozzle may include a connection ring 720 that has multiple air intake elements 730. The connection ring 720 may be coupled to a connector 740 which is, in turn, coupled to an output port 750. Such an implementation may generate a mixed fluid including air and water at the output port. Some embodiments may utilize the output port as a nozzle without including the connection ring 720 or connector 740 (i.e., the port 750 may be coupled directly to the conduit 710).

Some embodiments may include an adaptable manifold that is able to be converted to any of the above and below mentioned injectors, inlets, and/or outlets. Such a manifold may include a conduit passing through the center line of a grow container. The conduit may rest on the bottom of the container. The conduit may be coupled to one or more threaded "T" connectors that may be coupled to the various inlets, outlets, and injectors. Unused connectors may be capped or otherwise closed.

Some embodiments may include an end-cap aligned inline injector that is able to be coupled to the end of some section of conduit and may span multiple containers in a row. The end cap injector may include an inlet, an output nozzle, and a coupling element that allows the end cap injector to be securely fastened to the end of a piece of conduit and centered in the flow path of the conduit.

One of ordinary skill in the art will recognize that the above example implementations are provided for exemplary purposes only and that different embodiments may be implemented in various different ways without departing from the scope of the disclosure. For instance, different embodiments may include various different irrigation and return line configurations than shown or described above (e.g., multiple of each type of line may be included in each container, the lines may be placed at various different heights or locations than shown, etc.). In addition, the drawings related to the above description do not necessarily show each element to scale. Different embodiments may include different sizes of conduits, containers, nozzles, etc.

II. Plant Management

Figure 8:
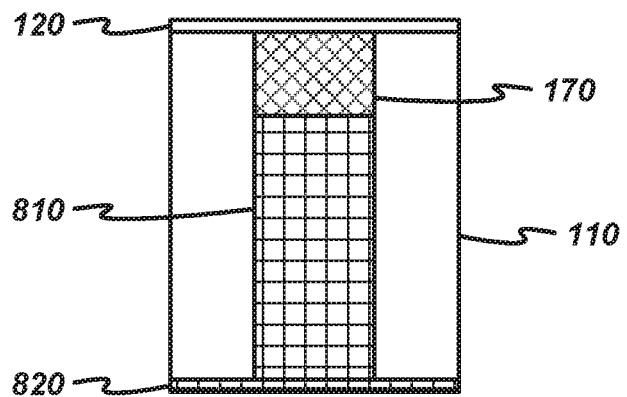
FIG. 8 illustrates a front elevation view of a grow basket and support according to an exemplary embodiment.

FIG. 8 illustrates a front elevation view of a grow basket 170 and support 810 according to an exemplary embodiment. As shown, a grow container 110 may include a lid 120 with a basket 170 and a support 810. The support may include one or more guides 820 or alignment elements that align the support 810 with the grow basket 170. The support 810 may have a cylinder shape to match the basket 170. Although the support 810 and basket 170 are shown as having matching radii, the support 810 may be wider or narrower than the basket 170 in some embodiments. The support 810 may be made from netting and may have a similar structure to the basket itself 170. The support 810 may include a horizontal net wall dividing the plant medium 170 from the support basket 810 below. In some embodiments, the bottom edges of the support basket may align with slots or guides in the bottom of the container 110.

Figure 9:
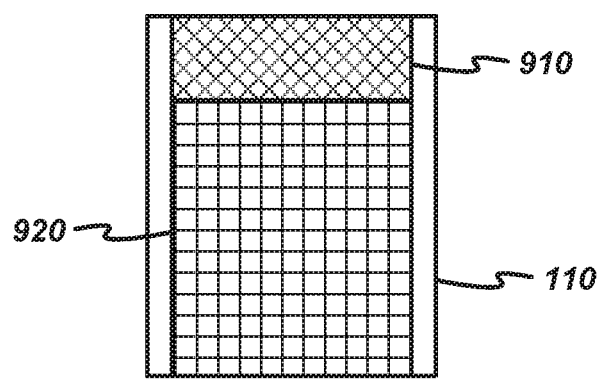
FIG. 9 illustrates a front elevation view of an alternative grow basket and support according to an exemplary embodiment.

FIG. 9 illustrates a front elevation view of an alternative grow basket 910 and support 920 according to an exemplary embodiment. The basket 910 may be attached to a lid or other appropriate element (not shown). Likewise, the support 920 may include one or more guides or alignment elements (not shown).

Figure 10:
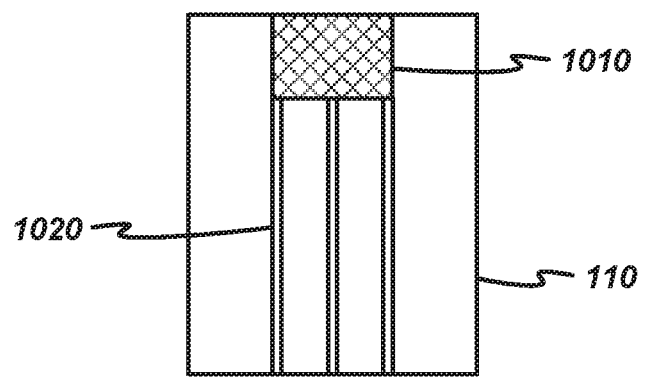
FIG. 10 illustrates a front elevation view of an alternative grow basket and support according to an exemplary embodiment.

FIG. 10 illustrates a front elevation view of an alternative grow basket 1010 and support 1020 according to an exemplary embodiment. As above, the basket 1010 may be attached to a lid or other appropriate element (not shown). In this example, the support 1020 includes a number of legs or columns distributed about the basket 1010. The legs may be connected or aligned using various guides or structural members, including slots or guides included in the bottom of the container 110.

Figure 11A:
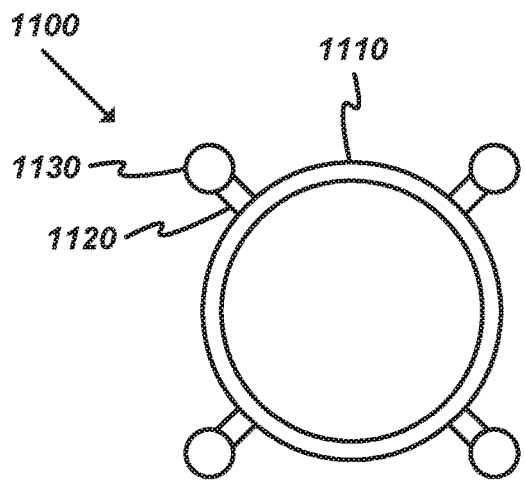
FIG. 11A illustrates a top plan view of a grow container support according to an exemplary embodiment.
Figure 11B:
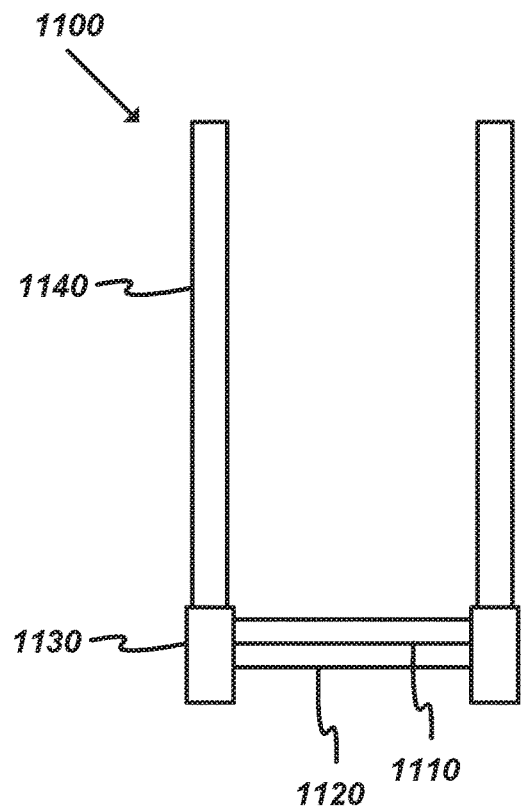
FIG. 11B illustrates a front elevation view of the grow container support of FIG. 11A.

FIG. 11A illustrates a top plan view of a grow container support 1100 according to an exemplary embodiment. FIG. 11B illustrates a front elevation view of the grow container support 1100. As shown, the container support may include a container support 1110, a structural support 1120, multiple vertical member supports 1130, and multiple vertical members 1140. The vertical members may provide support for growing plants, allow multiple containers to be stacked, and/or otherwise allow various grow structures to be implemented.

Figure 11C:
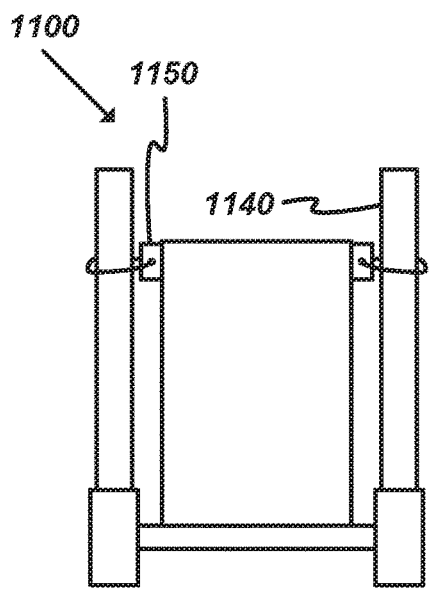
FIG. 11C illustrates a front elevation view of a grow container support including a grow container.

FIG. 11C illustrates a front elevation view of the grow container support 1100 including a grow container. In this example, the grow container has tabs with through-holes 1150 that allow the container to be coupled to the vertical members 1140. Such an approach may be used with flexible containers (e.g., burlap sacks). Zip ties may be used to secure the tabs to the vertical members. Due to the flexing and bulging of the plastic containers when the roots fill the containers and due to the changing weight of the plants upper canopy, such flexible couplings may provide advantages over rigid couplings.

Figure 12:
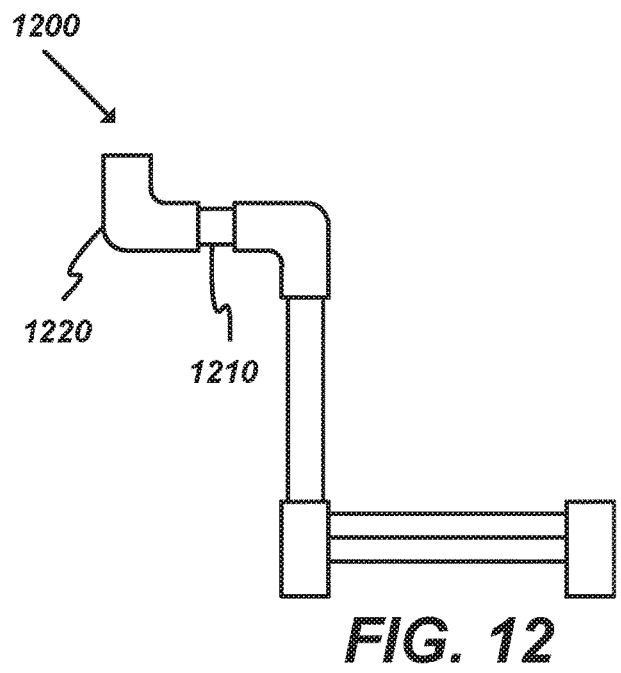
FIG. 12 illustrates a front elevation view of a grow container and plant support according to an exemplary embodiment.

FIG. 12 illustrates a front elevation view of a grow container and plant support 1200 according to an exemplary embodiment. As shown, the container support 1100 described above may further include additional members 1210 and connectors 1220 that may provide various structural support elements. Such elements may be coupled to various other system components (e.g., plant supports, grow baskets, plant cage such as tomato cages, screen of green (SCROG) upper plant netting support system, etc.). In addition, the support may include additional risers, tables, or legs that may increase the space between the container and floor to improve access.

One of ordinary skill in the art will recognize that the above example implementations are provided for exemplary purposes only and that different embodiments may be implemented in various different ways without departing from the scope of the disclosure. For instance, different embodiments may include various different structural supports, stands, risers, etc. as appropriate for implementing the various embodiments described throughout.

III. Mixing Architectures

Figure 13:
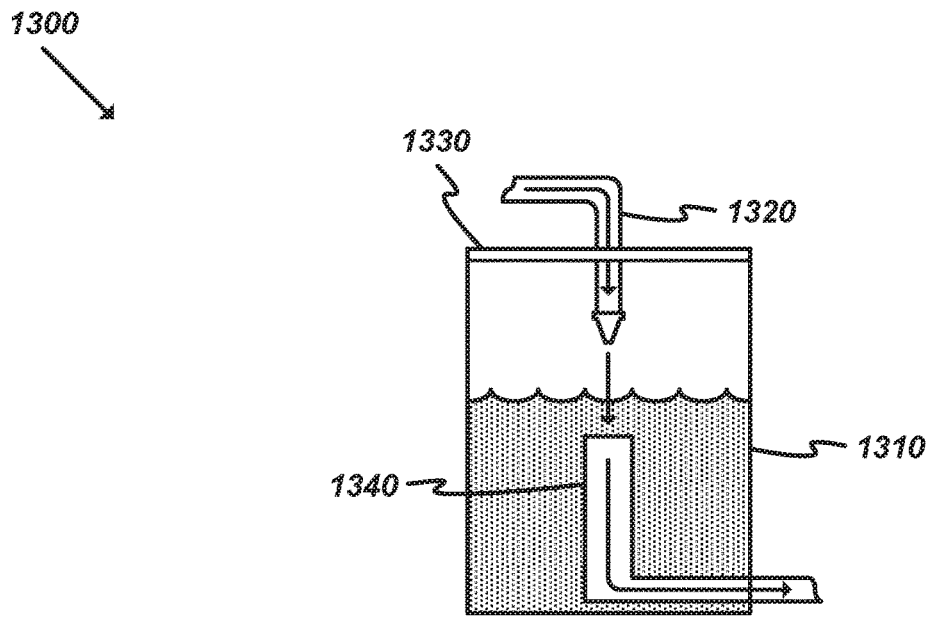
FIG. 13 illustrates a front elevation view of a hydroponic supply container according to an exemplary embodiment.

FIG. 13 illustrates a front elevation view of a hydroponic supply container 1300 according to an exemplary embodiment. As shown, the container may include a vessel 1310, an injector 1320, a lid 1330, and an outlet collector 1340. In this example, the water supply is passed through a nozzle, to water in the container, and through the outlet collector 1340 aligned with the nozzle flow. The output includes aerated water that is able to be supplied to grow containers such as container 100.

The vessel 1310 and injector 1320 may be similar to vessel 110 and injector 610 described above. The optional lid 1330 may include a through-hole or other appropriate feature such that the injector 1320 is aligned with the outlet collector 1340.

Figure 14:
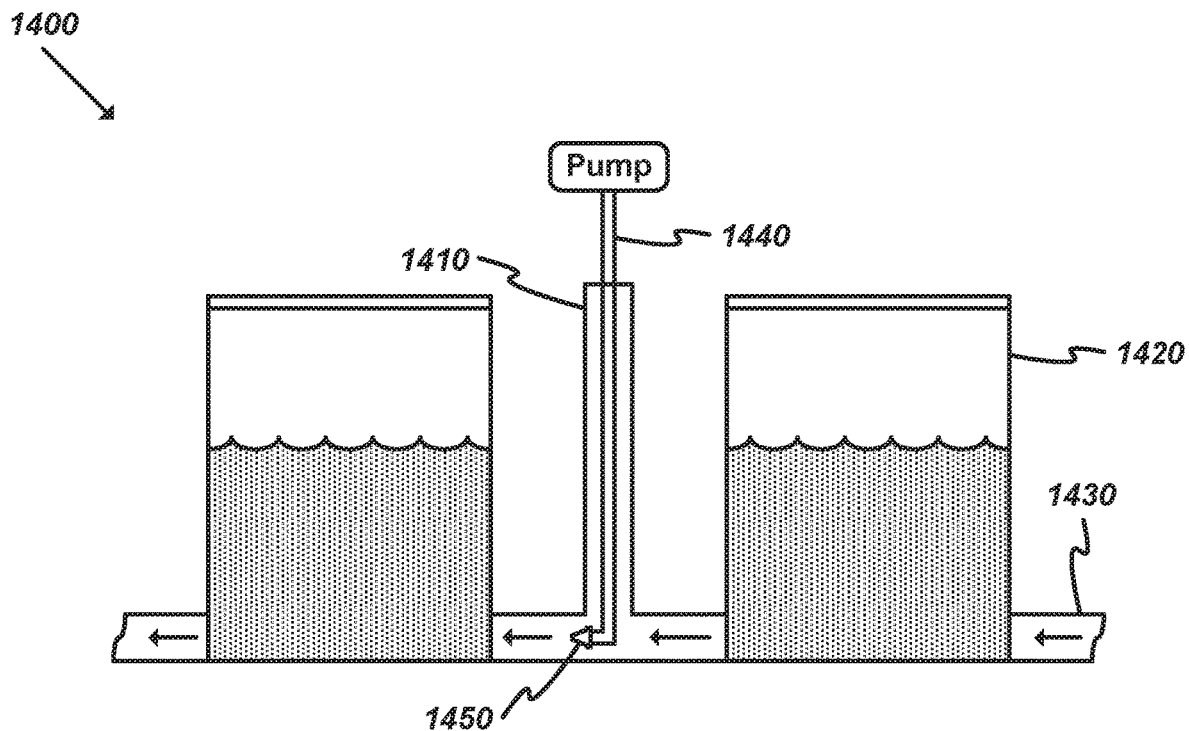
FIG. 14 illustrates a front elevation view of a portion of a hydroponic grow system including an injection sleeve according to an exemplary embodiment.

FIG. 14 illustrates a front elevation view of a portion of a hydroponic grow system 1400 including an injection sleeve 1419 according to an exemplary embodiment. As shown, a number of containers 1420 may be connected by an irrigation line 1430. The sleeve 1410 may be coupled to the line 1430 such that the pump is able to feed water or other fluid through a line 1440 within the sleeve 1410 to an output nozzle 1450.

Figure 15A:
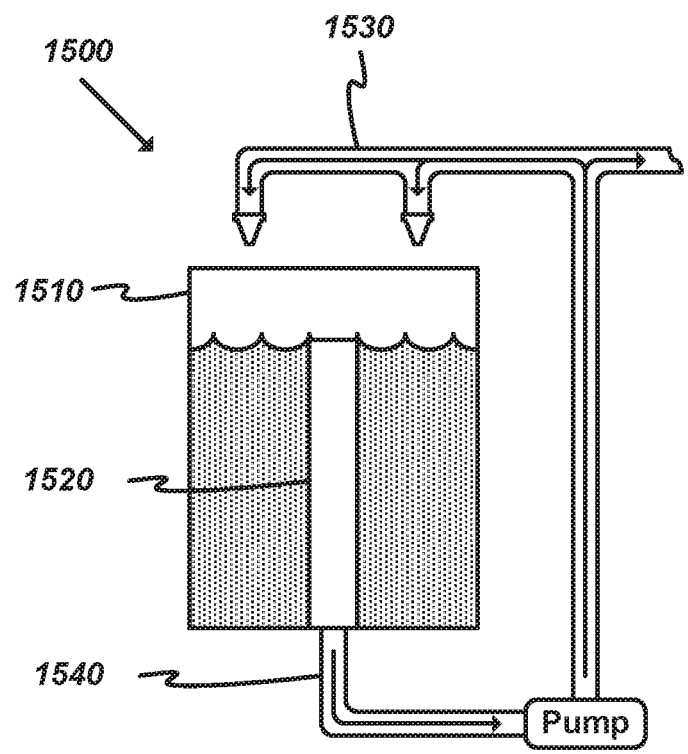
FIG. 15A illustrates a front elevation view of a hydroponic mixing container according to an exemplary embodiment.
Figure 15B:
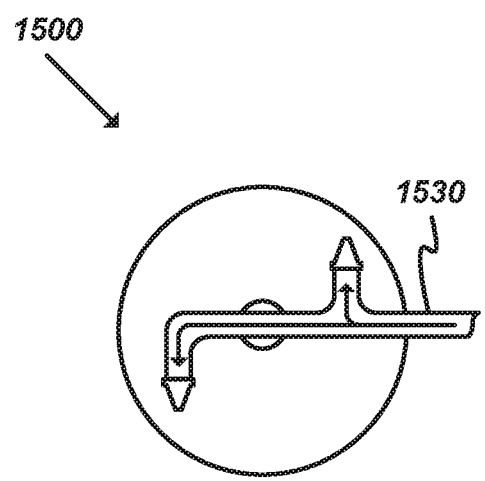
FIG. 15B illustrates a top plan view of the hydroponic mixing container of FIG. 15A.

FIG. 15A illustrates a front elevation view of a hydroponic mixing container 1500 according to an exemplary embodiment. FIG. 15B illustrates a top plan view of the hydroponic mixing container 1500. As shown, the mixing container may include a vessel 1510, an outlet collector 1520, dual output injector 1530, and a return line 1540. The dual output injector 1530 may create a vortex in the vessel 1510, where the vortex is aligned with (and sized appropriately for) the output collector 1520. The output collector height may be set to act as an overflow or set below surface to act as a drain. The height may be adjusted using threaded couplings by simply adding or removing pipe or the height may be adjusted using a smaller pipe inside a larger pipe where the larger pipe may have compression nut to lock the smaller pipe into place at the appropriate height.

Figure 16:
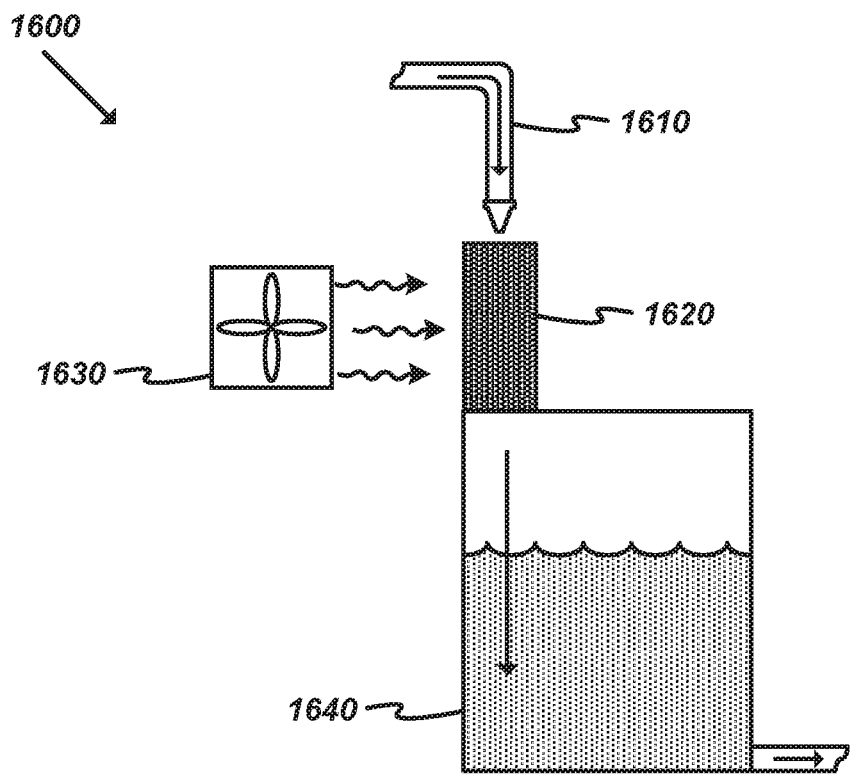
FIG. 16 illustrates a front elevation view of a hydroponic container with an air-cooled injector of some embodiments.

FIG. 16 illustrates a front elevation view of a hydroponic container 1600 with an air-cooled injector of some embodiments. As shown, the output of injector 1620 may be passed through a sleeve 1620 that is cooled by a fan 1630 before being passed to vessel 1640. The sleeve 1620 may include a number of apertures that allow air to pass through (or be made of air-permeable material). Other embodiments may use air conditioning or refrigeration to cool the solution. In addition, some embodiments may include misters or other appropriate cooling elements.

Figure 17:
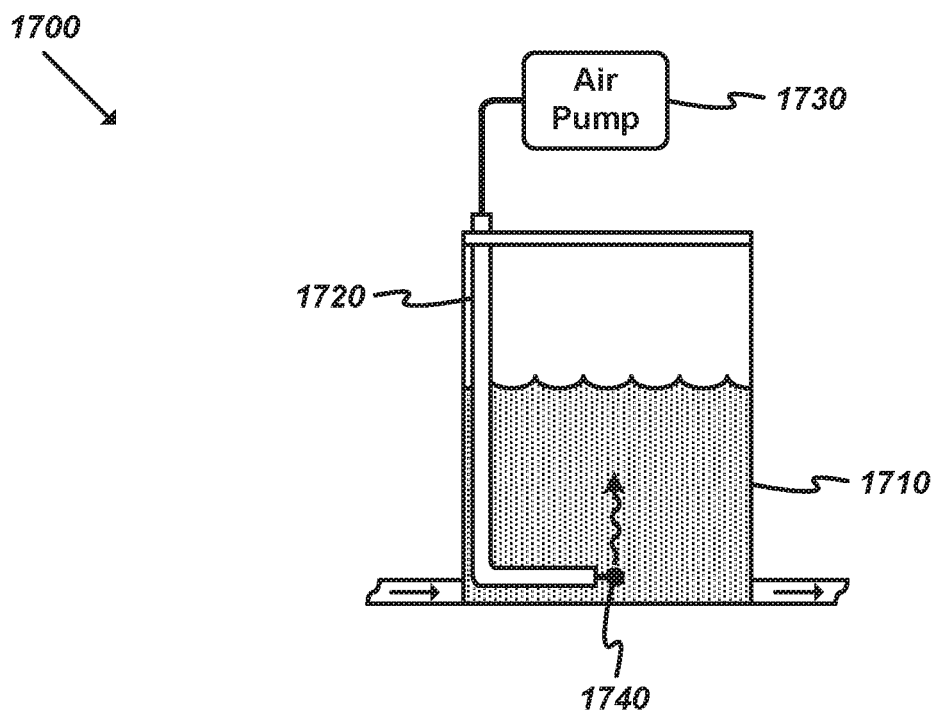
FIG. 17 illustrates a front elevation view of a hydroponic container with an air injector of some embodiments.

FIG. 17 illustrates a front elevation view of a hydroponic container 1700 with an air injector of some embodiments. As shown, the container may include a vessel 1710 and associated air injection sleeve 1720. An air pump 1730 may provide aeration through an air stone 1740 or other appropriate element. The sleeve 1720 may allow for easy servicing or replacement of the air stone 1740 without disturbing a plant's roots.

The air injection sleeve 1720 may be a rigid pipe, bar, or conduit. Air tubing may pass through the sleeve and allow an air stone 1740 to be connected at the bottom end of the tubing. Some embodiments may include a retaining element such as a snap cage holder for the air stone at the end of the sleeve 1720 that holds air stone 1740 in place. The top portion of the sleeve may connect to the top of the lid through an aperture with a snug fit, with a wider top lip at the top portion of the sleeve 1720 to stop the sleeve from falling through the lid, and/or other appropriate ways. Such a secure fit allows a user to pull out the air stone without reaching into the container and positions the air stone in the bottom center (for example) of the container.

The sleeve 1720 may allow a new air stone 1740 to be fed through the thick plant roots of an established plant to be positioned at the bottom of the grow container 1710. Air stones 1740 typically float and move around and must be secured to the bottom of a container with suction cups or weights. In addition, the sleeve 1720 allows for replacement of air stones 1740 without requiring a user to contact to the grow solution, thus eliminating a source of contamination. The air stone sleeve 1720 may be disposable and coupled to the air tubing at the top portion of the sleeve.

Figure 18:
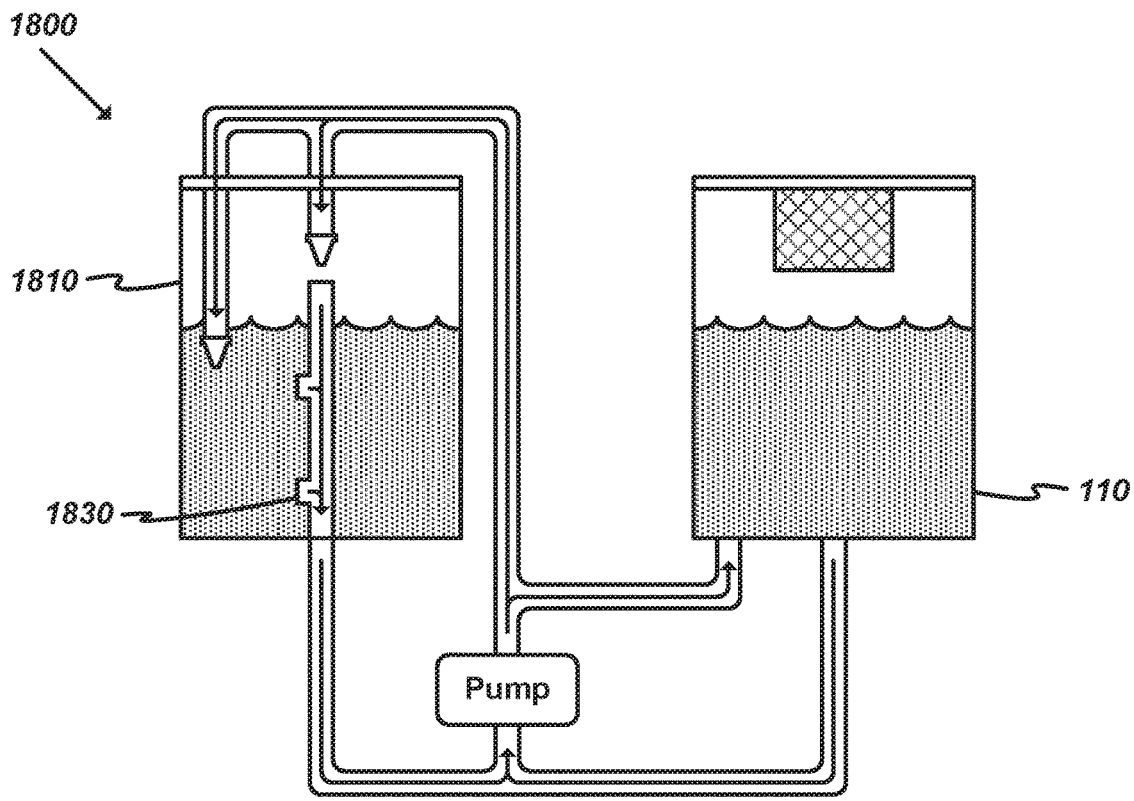
FIG. 18 illustrates a front elevation view of a portion of a recirculating system of some embodiments.

FIG. 18 illustrates a front elevation view of a portion of a recirculating system 1800 of some embodiments. As shown, a dual injector output may be used in a first vessel 1810. The output of the first vessel may include one or more submerged inlets 1830. The output of the first vessel and the output(s) of any number of grow containers 110 are combined and distributed to the vessels 1810 and 110.

Figure 19:
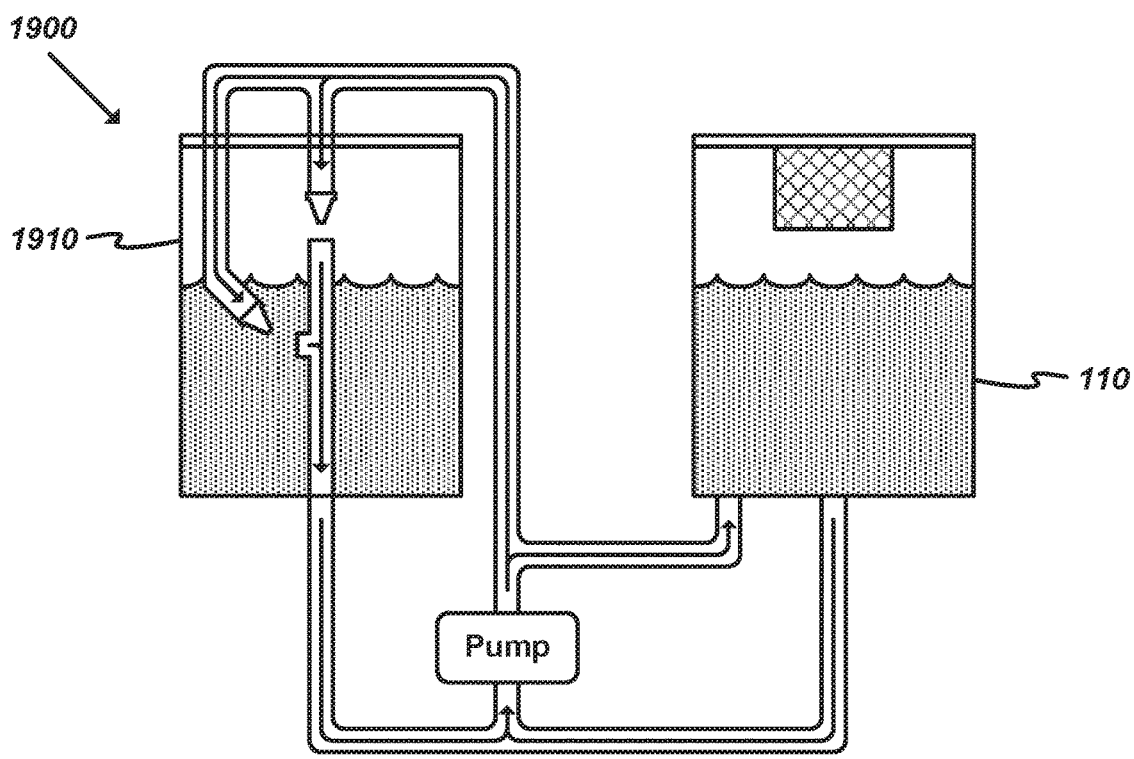
FIG. 19 illustrates a front elevation view of a portion of an alternative recirculating system of some embodiments.

FIG. 19 illustrates a front elevation view of a portion of a recirculating system 1900 of some embodiments. As shown, a dual injector output may be used in a first vessel 1910, where the output of the first vessel and the output(s) of any number of grow containers 110 are combined and distributed to the vessels 1910 and 110. In this example, one or more injector nozzles may be aligned with the inlet 1830 as shown.

Figure 20:
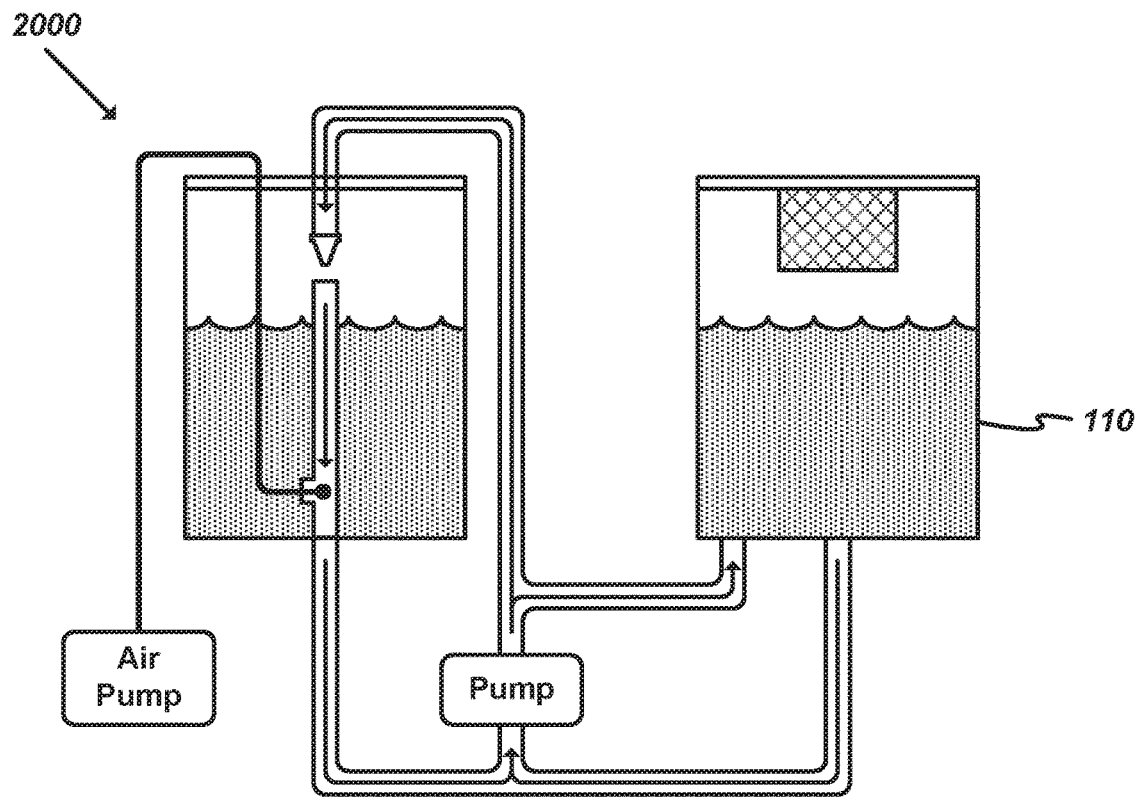
FIG. 20 illustrates a front elevation view of a portion of an alternative recirculating system of some embodiments.

FIG. 20 illustrates a front elevation view of a portion of an alternative recirculating system 2000 of some embodiments. In this example, an air line and output may be fed through inlet 1830 as shown.

Figure 21:
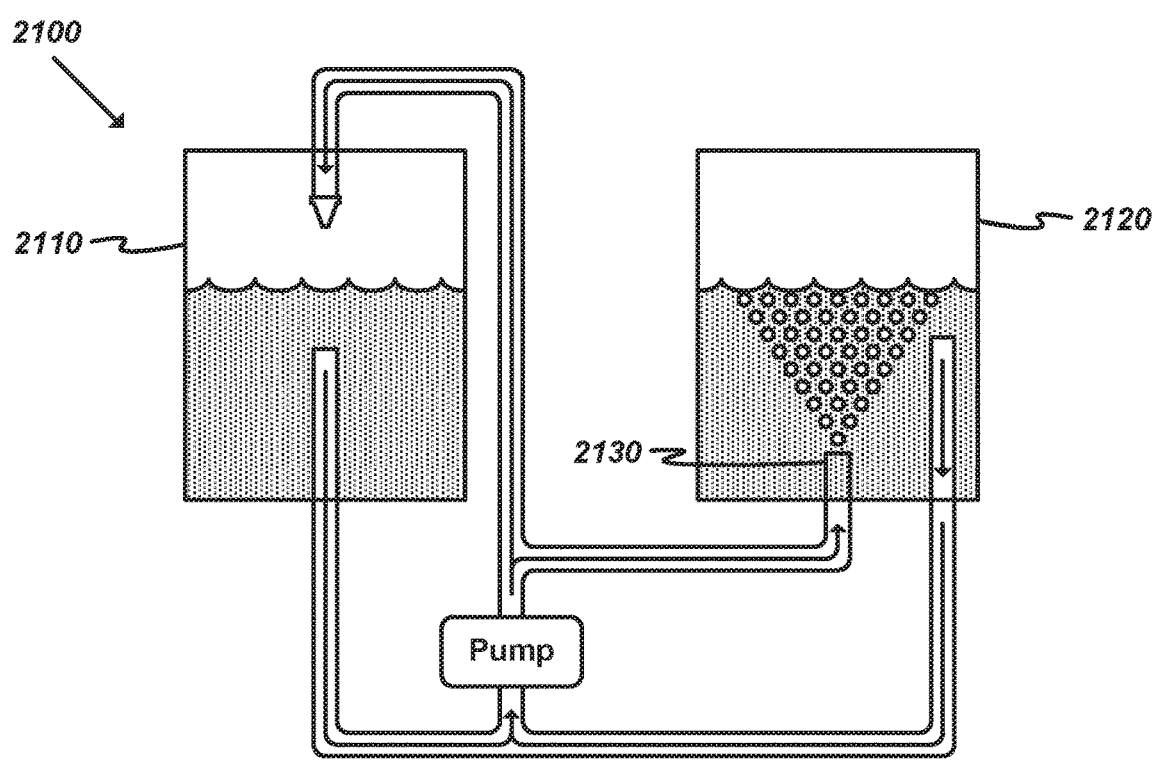
FIG. 21 illustrates a front elevation view of a portion of an alternative recirculating system of some embodiments.

FIG. 21 illustrates a front elevation view of a portion of an alternative recirculating system 2100 of some embodiments. As shown, a first container 2110 includes an injector aligned with an outlet collector. A second container 2120 includes a return line set at an appropriate height to collect aerated solution for recirculation. The outlet 2130 of the second container may be referred to as a bubble generating bottom inlet injector.

The various architectures described above may be included in one or more reservoirs used by the hydroponic systems described herein. Such reservoirs may generally be used for distributing fluids and nutrients to the grow containers described above. Each "reservoir" may include any number of vessels, mixing architectures, conduit, etc. as necessary to distribute the grow solution among a group of plants.

One of ordinary skill in the art will recognize that the above example implementations are provided for exemplary purposes only and that different embodiments may be implemented in various different ways without departing from the scope of the disclosure. In addition, various features may provide additional functionality depending on the usage scenario or situation. For instance, an outlet collection port may normally be used above the water level. If the water level rises, the collection port may become submerged and automatically operate as an overflow outlet.

IV. Filter Architectures

Figure 22A:
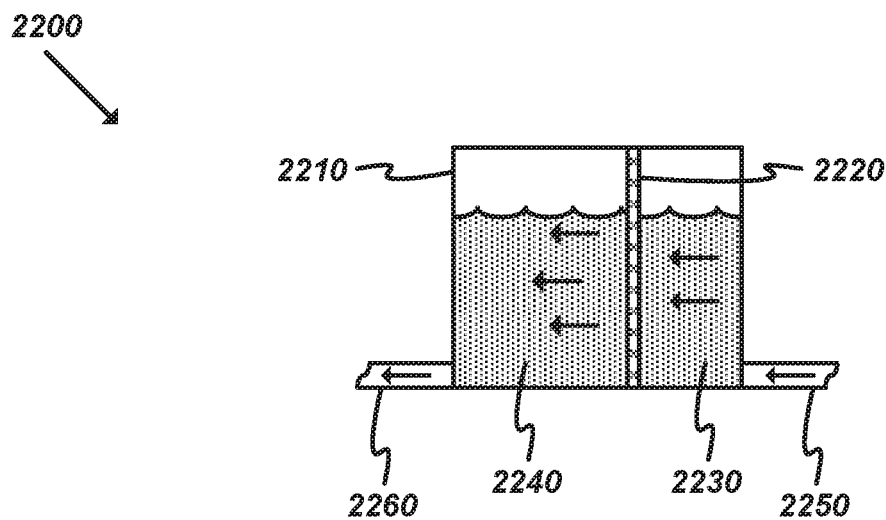
FIG. 22A illustrates a front elevation view of a hydroponic container with a filter of some embodiments.
Figure 22B:
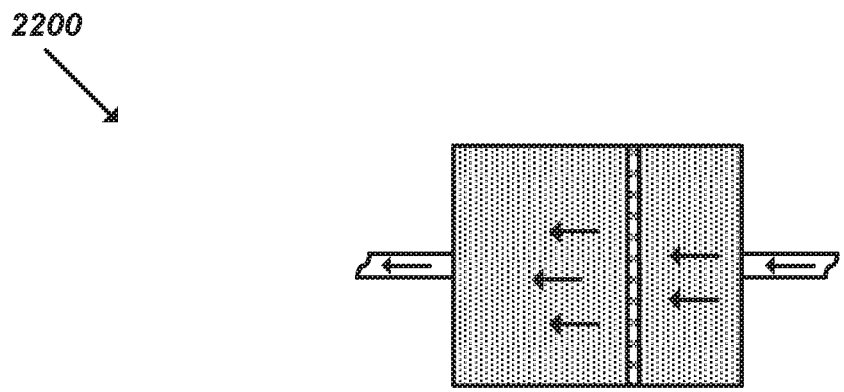
FIG. 22B illustrates a top plan view of the hydroponic container of FIG. 22A.

FIG. 22A illustrates a front elevation view of a hydroponic container 2200 with a filter of some embodiments. FIG. 22B illustrates a top plan view of the hydroponic container 2200. As shown, the container may include a vessel 2210, a filter 2220, an unfiltered storage area (or "return tank") 2230, a filtered storage area (or "mixing and/or distribution tank") 2240, an inlet port 2250, and an outlet port 2260.

The filter 2220 may be a material such as a mesh or screen, that includes multiple apertures such that fluids are able to pass through while particles above a size threshold are removed. The filter may be secured by channels or guides such that the filter may be easily removed for replacement or cleaning.

In some embodiments, an additional screen may be included at an outlet aperture of the reservoir in order to filter any unwanted items that fall into the reservoir.

Some embodiments may include multiple filters with different aperture sizes (e.g., a large particle filter may be followed by a smaller particle filter). The filter of some embodiments may include a number of pouches or pockets that are able to collect material that does not pass through the filter for easy removal.

Figure 23:
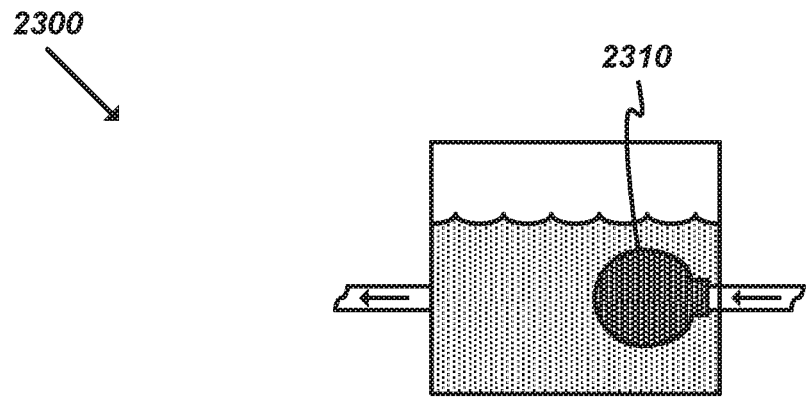
FIG. 23 illustrates a front elevation view of a hydroponic container with a bag filter of some embodiments.

FIG. 23 illustrates a front elevation view of a hydroponic container 2300 with a bag filter 2310 of some embodiments. The bag filter and screen filter 2220 may be combined such that the screen filter may be cleaned or replaced while the bag filter allows the systems to continue operation without allowing unfiltered solution to pass.

Figure 24:
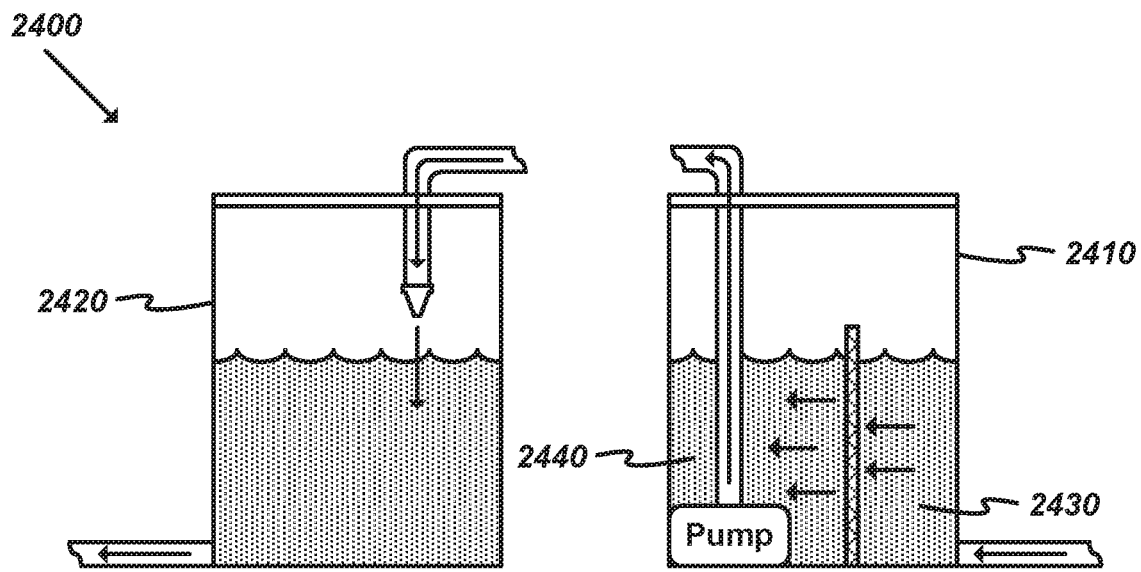
FIG. 24 illustrates a front elevation view of a portion of a filtering recirculating system of some embodiments.

FIG. 24 illustrates a front elevation view of a portion of a filtering recirculating system 2400 of some embodiments. As shown, the first container 2410 includes a filter 2220 and a submersible pump located on the filtered side of the screen 2220. Filtered solution is then propagated to a second container 2420.

In this example, the first container includes a return tank 2430 and distribution tank 2440, while the second container 2420 may serve as a mixing tank (and/or distribution tank). The mixing and distribution tanks may be combined into a single vessel (or portion of a vessel) in some embodiments.

Figure 25:
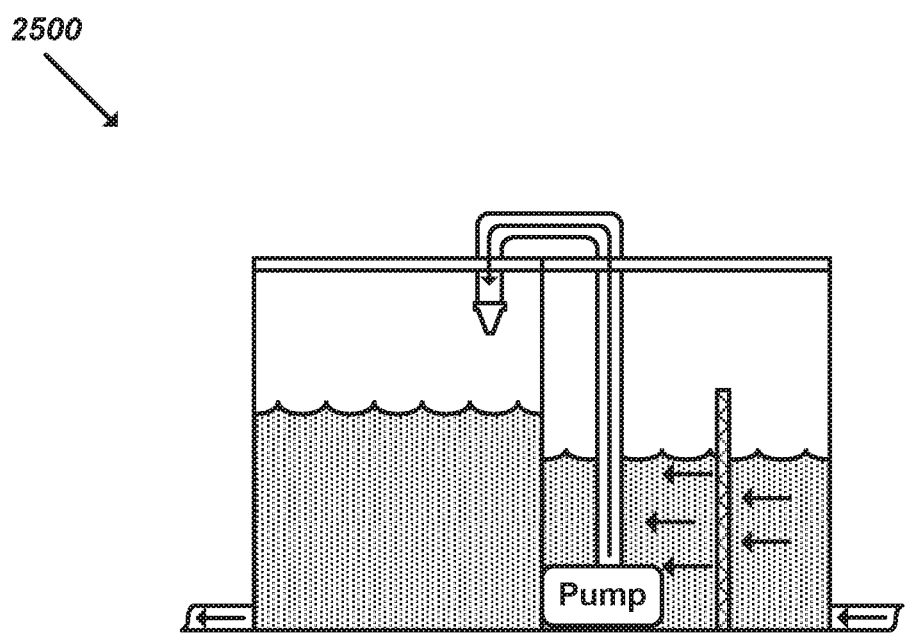
FIG. 25 illustrates a front elevation view of a portion of an alternative filtering recirculating system of some embodiments.

FIG. 25 illustrates a front elevation view of a portion of an alternative filtering recirculating system 2500 of some embodiments. In this example, the two containers 2410 and 2420 described above are combined into a single unit.

One of ordinary skill in the art will recognize that the above example implementations are provided for exemplary purposes only and that different embodiments may be implemented in various different ways without departing from the scope of the disclosure. For instance, some embodiments may include multiple filters in series. As another example, some embodiments may include multiple filter containers distributed throughout a grow system.

V. Recirculating Systems

Figure 26:
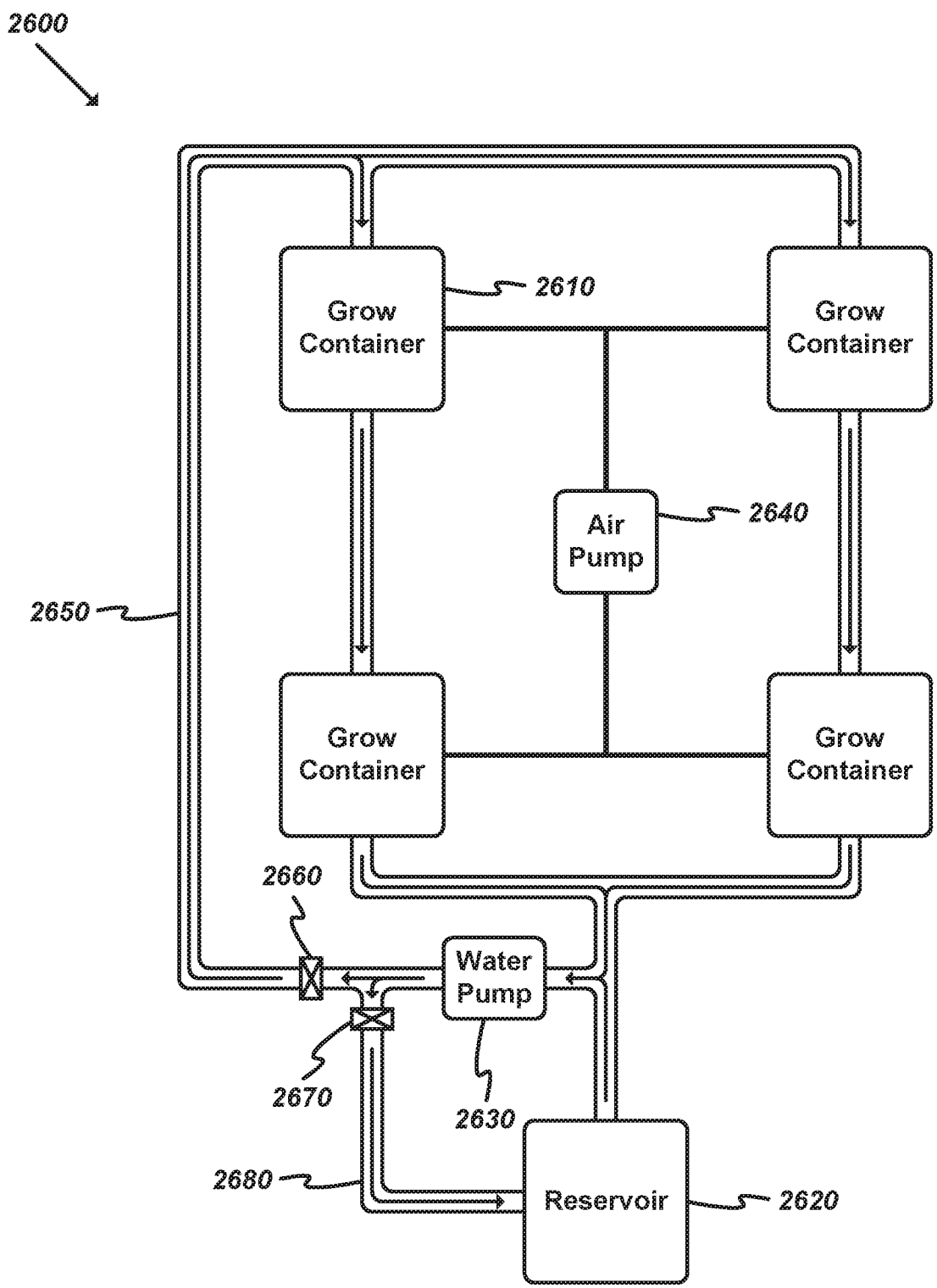
FIG. 26 illustrates a schematic block diagram of a hydroponic grow system according to an exemplary embodiment.

FIG. 26 illustrates a schematic block diagram of a hydroponic grow system 2600 according to an exemplary embodiment. As shown, the system may include one or more grow containers 2610, a reservoir 2620, a water pump 2630, an air pump 2640, fluid conduits 2650, one or more gate valves 2660-2670, and a return loop 2680.

Each grow container 2610 may be similar to container 110 described above. The grow containers 2610 may be of different size, shape, etc. as appropriate for a particular plant or crop. Each grow container may be associated with a stand or support. Each grow container may have at least one inlet and at least one outlet. In addition, each grow container may include various features described above (e.g., an air injection sleeve, levelling lines, etc.), either alone or in combination. Each individual grow container may include different specific features and/or attributes. Such features and/or attributes may be selected to optimize performance for various different plants. Each grow container may include a lid and plant basket, with an optional support as described above. Each grow container may include one or more injectors.

The reservoir 2620 may include one or more vessels and various features such as those described in Section III above. In this example, the reservoir has a single inlet and a single outlet. In other systems, the reservoir may include parallel supply and/or return lines, with any number of inlets and/or outlets. The reservoir or levelling tank may have a clean water supply and drain (not shown). The reservoir may include multiple elements including a return tank, a filtered return tank, and a mixing vessel. In this example, the system 2600 includes a single reservoir 2620. Different embodiments may include different numbers of reservoirs, which may be distributed among an array of grow containers, based on various relevant parameters (e.g., number of containers, distance between containers, etc.).

The water pump 2630 may be an electric or electronic device that is able to move fluid along the conduit path 2650. The pump 2630 may be external to the fluid, as in this example, or submersed in the fluid. Different embodiments may include different numbers of pumps, which may be distributed among an array of containers, similar to the reservoir (e.g., some embodiments may include one pump for each reservoir, one pump for a number of grow containers, etc.).

The air pump 2640 may be able to move air through a feed line or tube to an outlet such as an air stone. Different embodiments may include different numbers of air pumps, which may be distributed throughout the system 2600.

The conduit 2650 may include various members (e.g., cylindrical pipes) and various connectors. The members and/or connectors may be sized depending on various relevant factors (e.g., flow rate, pump size, system volume, etc.).

Each gate valve 2660-2670 may be able to control fluid flow through a portion of the conduit 2650. Each gate valve 2660-2670 may provide discrete flow control (i.e., on or off) or adjustable control where flow rate is able to be increased (e.g., by turning a knob in a counterclockwise direction) or decreased (e.g., by turning the knob in a clockwise direction) to any desired flow rate from fully open to fully closed. Gate valves may be distributed throughout the system. Gate valves may be used for operational control, where the valves may be used to modify the performance of the system (e.g., by closing a recirculating line). Gate valves may also be used to isolate various elements for service or replacement (e.g., by closing all lines associated with a grow container 2610). Thus, additional gate valves 2660 may be distributed throughout the system 2600.

The return loop 2680 may be a portion of conduit that connects the output of the pump 2630 to the reservoir 2620 intake as shown.

Nutrients may be added to the reservoir 2620 for distribution to the containers 2610. As shown, the pump 2630 may direct the reservoir solution to each container 2610 (and, more specifically, to one or more injectors associated with the container). In addition, each container may have a return line that may be associated with a drain or other outlet of the vessel. The various return lines may return mixed fluids and/or other materials from each container as shown. The pump 2630 may further direct solution from the reservoir 2620 and mixed fluids from the grow containers 2610 back to the reservoir 2620 through the return loop 2680 in order to thoroughly mix the solution. Gate valve 2660 may be closed in order to maximize return mixing.

The nutrient solution may thus be shared among containers 2610 such that the solution supplied to each container is consistent across the system 2600 and the plants associated with the various containers 2610 may each receive a homogenous mixed supply.

Rather than the return tank 2230 and distribution tank 2240 described above, the example of system 2600 may include a filter at or near the inlet of pump 2630.

One of ordinary skill in the art will recognize that system 2600 may be implemented in various different ways than shown without departing from the scope of the disclosure. For instance, some embodiments may provide automated control of the pumps 2630-2640, valves 2660-2670, and/or other features of the system 2600.

Figure 27:
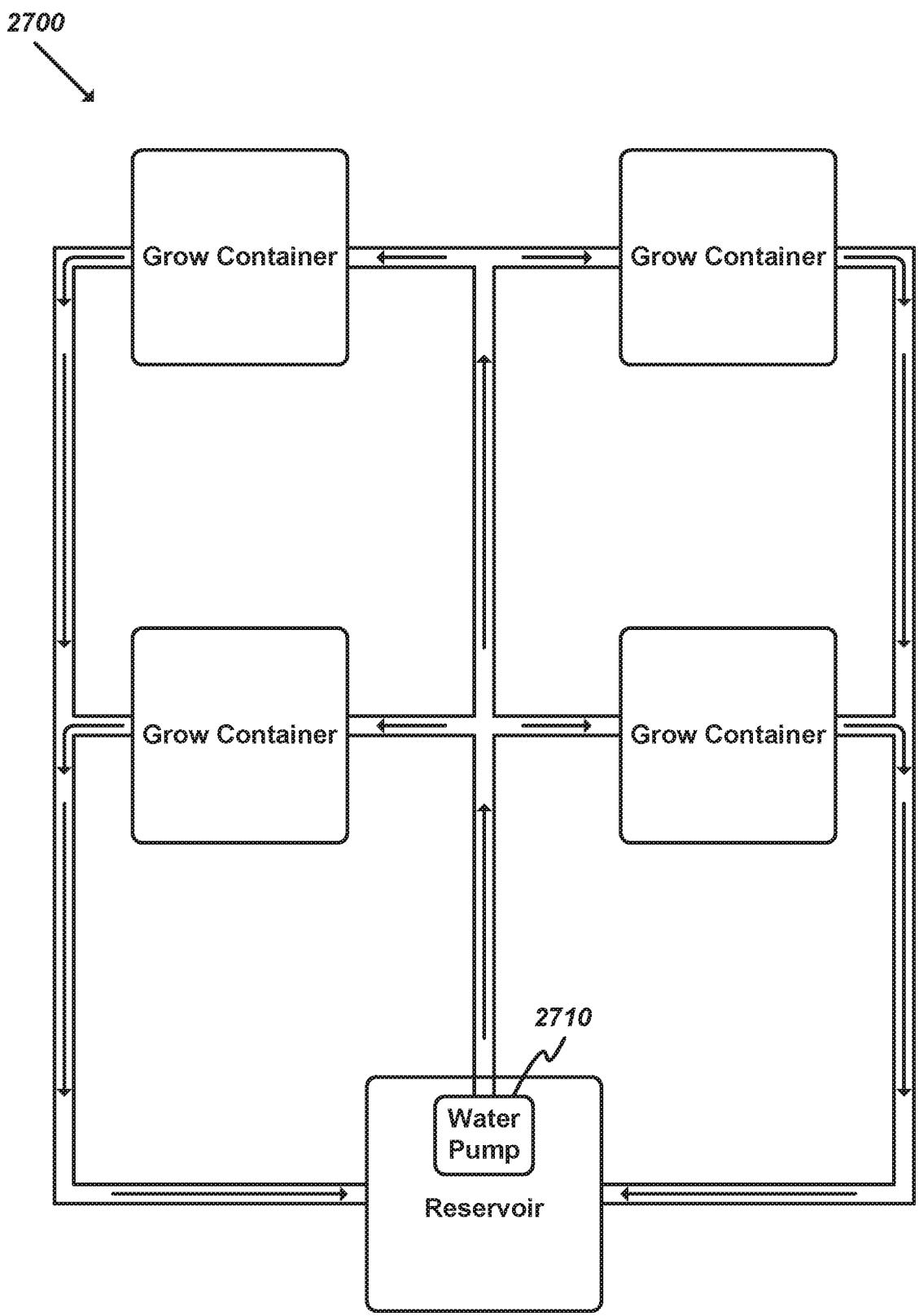
FIG. 27 illustrates a schematic block diagram of an alternative hydroponic grow system according to an exemplary embodiment.

FIG. 27 illustrates a schematic block diagram of an alternative hydroponic grow system 2700. This example includes a submersible pump 2710. In this embodiment, the grow containers 2610 are fed in parallel (thus allowing for use of injectors at each container).

Figure 28:
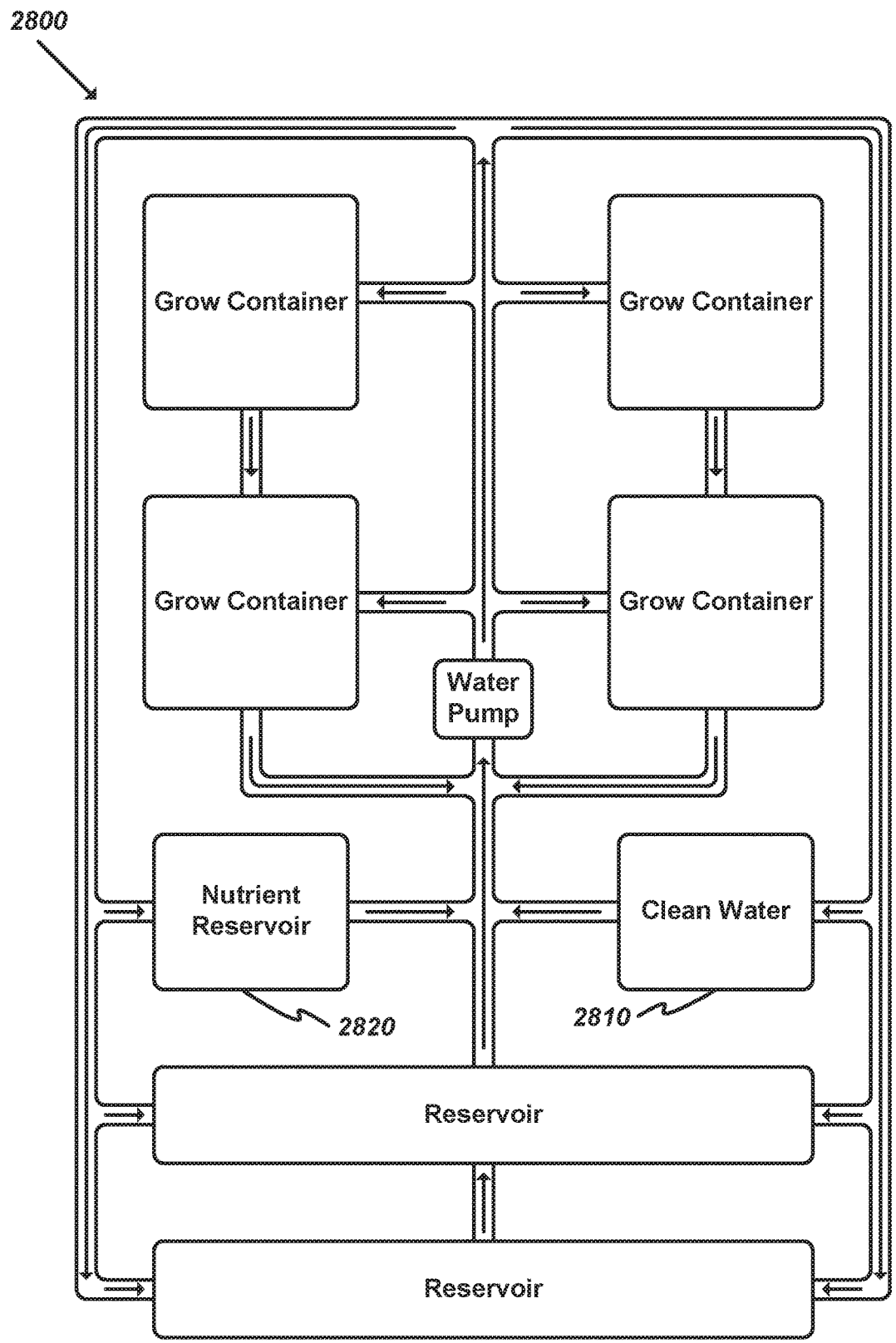
FIG. 28 illustrates a schematic block diagram of an alternative hydroponic grow system according to an exemplary embodiment.

FIG. 28 illustrates a schematic block diagram of an alternative hydroponic grow system 2800. This example includes a clean water tank or supply 2810 and a nutrient reservoir 2820. In addition, this example provides parallel supplies to each container 2610.

The clean water tank or supply 2810 may continually replace water lost to evaporation, plant use, spillage, etc. The nutrient reservoir 2820 may be utilized to mix nutrients into the distributed solution. The nutrient reservoir may utilize any of the mixing features described in Section III above.

The reservoir(s) may typically include float valves that connect to a water supply source such as a raised replenishing reservoir tank. Alternatively, the reservoir(s) may be connected directly to a pressurized water source.

This example further includes multiple return reservoirs 2620, which may provide additional filtering and mixing capacity.

Figure 29:
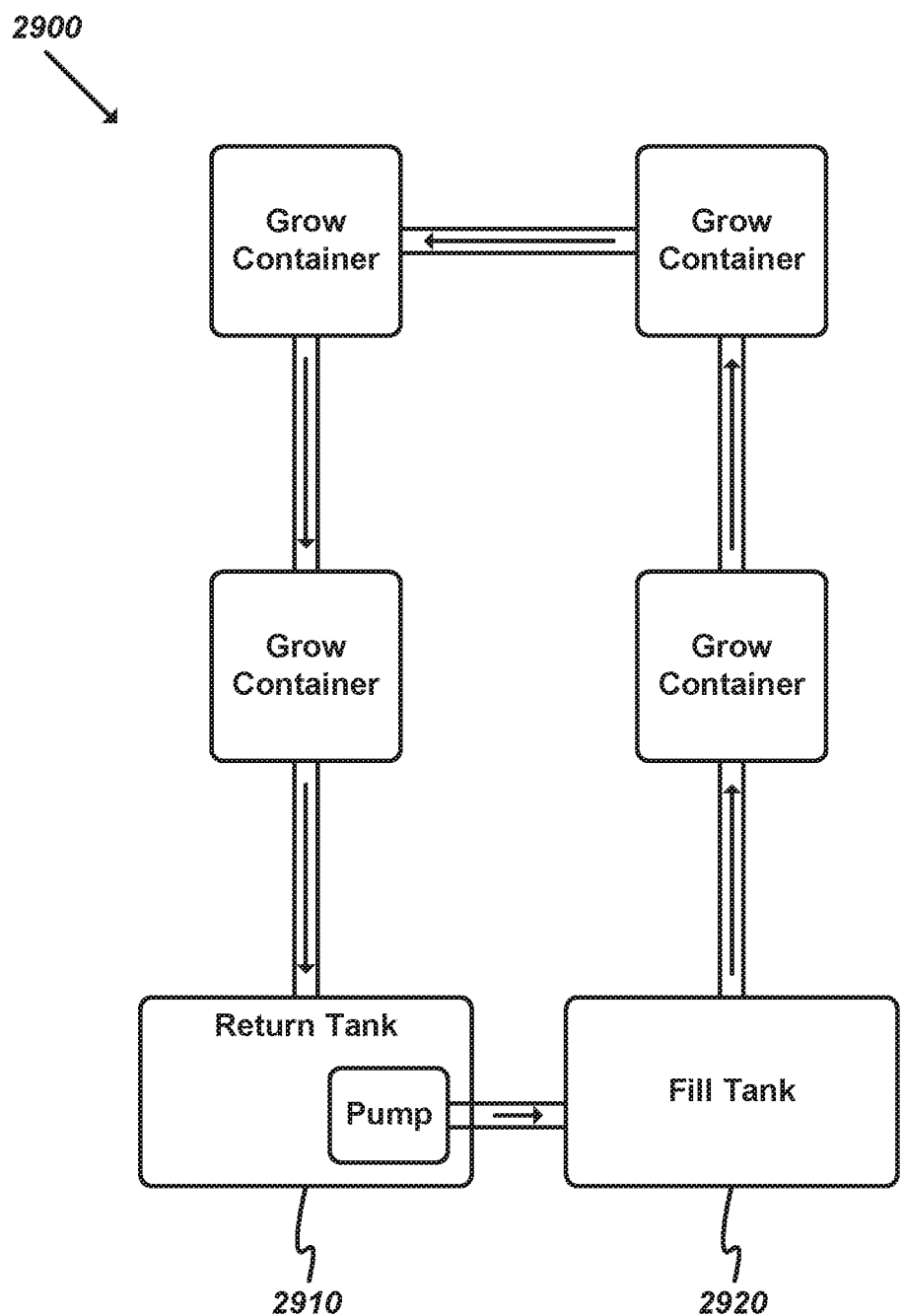
FIG. 29 illustrates a schematic block diagram of an alternative hydroponic grow system according to an exemplary embodiment.

FIG. 29 illustrates a schematic block diagram of an alternative hydroponic grow system 2900. This example includes a combined feed and return loop that connects the grow containers 2610 in series. In addition, this system 2900 includes a return tank 2910 and fill tank 2920. The return tank 2910 may include a filter while the fill tank 2920 may be used to add and mix nutrients for distribution to the containers 2610.

Systems 2600-2900 may be scaled in various appropriate ways. For instance, additional grow containers 2610 may be added in serial or parallel to those shown. As another example, multiple iterations of each system 2600-2900 may be used to provide additional capacity (or different example systems may be combined into a single system).

Each system or element described above may be used separately or in combination with other elements or sets of elements. Different embodiments may provide different specific layouts, capacities, etc. as appropriate for a particular application. In addition, various other elements than shown may be included. For instance, grow systems may include lights, heaters, etc. As another example, one or more grow systems may be integrated into a structure or facility (e.g., a greenhouse).

The foregoing relates to illustrative details of exemplary embodiments and modifications may be made without departing from the scope of the disclosure as defined by the following claims.

I claim:

1. A hydroponic grow system comprising:
   a plurality of grow containers;
   a reservoir comprising:
      an inlet that permits fluid to flow into the reservoir, the inlet comprising a first connector;
      an outlet that permits fluid to flow out of the reservoir, the outlet comprising a second connector; and
      a mixing vessel having an injector, wherein the outlet of the reservoir comprises a cylindrical collector having an input and an output of the injector is aligned with the input of the cylindrical collector such that a stream of fluid flows from the output of the injector to the input of the cylindrical collector, wherein the input of the cylindrical collector is situated above a water surface level of the mixing vessel and the output of the injector is situated above the water surface level of the mixing vessel; and
   a water pump comprising:
      an input that draws fluid into the pump, the input comprising a third connector; and
      an output that expels fluid out of the pump, the output comprising a fourth connector,
   wherein the output of the water pump is coupled to the inlet of the reservoir via the fourth connector and the first connector, the outlet of the reservoir is coupled to the input of the water pump via the second connector and the third connector, the output of the water pump is coupled to an inlet of at least one grow container from the plurality of grow containers via the fourth connector, and the input of the water pump is coupled to an outlet of at least one grow container from the plurality of grow containers via the third connector,
   wherein the water pump, the third connector, the fourth connector, and the plurality of grow containers instantiate a feedback loop that does not include the reservoir.

2. The hydroponic grow system of claim 1, wherein at least one outlet from at least one grow container from the plurality of grow containers is coupled to the input of the water pump.

3. The hydroponic grow system of claim 1 further comprising an air pump having an output coupled to an inlet of at least one grow container from the plurality of grow containers.

4. The hydroponic grow system of claim 1, wherein at least one grow container from the plurality of grow containers comprises an injector having a first output nozzle.

5. The hydroponic grow system of claim 4, wherein the injector further comprises a second output nozzle and the nozzles are aligned with the at least one grow container such that a vortex is generated in the at least one grow container, wherein the at least one grow container comprises a cylindrical vessel and the vortex revolves around a center axis of the cylindrical vessel.

6. The hydroponic grow system of claim 1, wherein at least one outlet of at least one grow container from the plurality of grow containers is coupled to at least one inlet of at least one other grow container from the plurality of grow containers.

7. The hydroponic grow system of claim 1, wherein at least one grow container from the plurality of grow containers comprises an annular bottom surface.

8. The hydroponic grow system of claim 1, wherein the input of the cylindrical collector is able to collect overflow from the injector.

9. A hydroponic grow system comprising:
at least one grow container;
a water pump; and
a cylindrical mixing vessel comprising:
 a set of injectors arranged to generate a vortex, wherein a center axis of the vortex is aligned with a center axis of the cylindrical mixing vessel; and
 a cylindrical collector, wherein a center axis of the cylindrical collector is aligned with the center axis of the cylindrical mixing vessel, wherein the cylindrical collector is able to collect overflow from at least one overhead injector from the set of injectors, wherein an output of the at least one injector from the set of injectors is aligned with the input of the cylindrical collector such that a stream of fluid flows from the output of the at least one injector to the input of the cylindrical collector, wherein the input of the cylindrical collector is situated above a water surface level of the cylindrical mixing vessel and the output of the at least one injector is situated above the water surface level of the cylindrical mixing vessel,
wherein the water pump and the at least one grow container instantiate a feedback loop that does not include the cylindrical mixing vessel.

10. The hydroponic grow system of claim 9, wherein the cylindrical collector comprises a submersed outlet along a wall of the cylindrical collector.

11. A hydroponic grow system comprising:
a plurality of grow containers;
a reservoir comprising:
 an inlet that permits fluid to flow into the reservoir, the inlet comprising a first connector;
 an outlet that permits fluid to flow out of the reservoir, the outlet comprising a second connector; and
 a cylindrical mixing vessel having first injector arranged to generate a vortex, wherein a center axis of the vortex is aligned with a center axis of the cylindrical mixing vessel, wherein the outlet of the reservoir comprises a cylindrical collector having an input and an output of a second injector is aligned with the input of the cylindrical collector such that a stream of fluid flows from the output of the at least one injector to the input of the cylindrical collector, wherein the input of the cylindrical collector is situated above a water surface level of the cylindrical mixing vessel and the output of the at least one injector is situated above the water surface level of the cylindrical mixing vessel,
wherein the outlet of the reservoir comprises a cylindrical collector that is aligned with the center axis of the cylindrical mixing vessel, wherein the cylindrical collector is able to collect overflow from the first injector and the second injector; and
a water pump comprising:
 an input that draws fluid into the pump, the input comprising a third connector; and
 an output that expels fluid out of the pump, the output comprising a fourth connector,
wherein the output of the water pump is coupled to the inlet of the reservoir via the fourth connector and the first connector, the outlet of the reservoir is coupled to the input of the water pump via the second connector and the third connector, the output of the water pump is coupled to an inlet of at least one grow container from the plurality of grow containers via the fourth connector, and the input of the water pump is coupled to an outlet of at least one grow container from the plurality of grow containers via the third connector,
wherein the water pump, the third connector, the fourth connector, and the plurality of grow containers instantiate a feedback loop that does not include the reservoir.

12. The hydroponic grow system of claim 11, wherein the cylindrical collector comprises a submersed outlet along a wall of the cylindrical collector.

* * * * *